(12) United States Patent
Lee et al.

(10) Patent No.: US 12,429,550 B2
(45) Date of Patent: Sep. 30, 2025

(54) ELECTRONIC DEVICE FOR ESTIMATING RELATIVE POSITION AND POSE AND OPERATING METHOD OF THE SAME

(71) Applicants: SAMSUNG ELECTRONICS CO., LTD., Suwon-si (KR); INDUSTRY-ACADEMIA COOPERATION GROUP OF SEJONG UNIVERSITY, Seoul (KR)

(72) Inventors: Heesae Lee, Suwon-si (KR); Hyungseok Kim, Seoul (KR); Soyoung Park, Hwaseong-si (KR); A S M Sharifuzzaman Sagar, Seoul (KR); Hanjun Kim, Suwon-si (KR); Hanwook Bae, Seoul (KR); Hyuncheol Jeon, Suwon-si (KR); Seokpyo Hong, Suwon-si (KR)

(73) Assignees: SAMSUNG ELECTRONICS CO., LTD., Suwon-si (KR); INDUSTRY-ACADEMIA COOPERATION GROUP OF SEJONG UNIVERSITY, Seoul (KR)

(*) Notice: Subject to any disclaimer, the term of this patent is extended or adjusted under 35 U.S.C. 154(b) by 336 days.

(21) Appl. No.: 18/216,112

(22) Filed: Jun. 29, 2023

(65) Prior Publication Data
US 2024/0004024 A1    Jan. 4, 2024

(30) Foreign Application Priority Data
Jun. 30, 2022   (KR) .................. 10-2022-0080853

(51) Int. Cl.
*G01S 5/02* (2010.01)
*G01S 5/14* (2006.01)

(52) U.S. Cl.
CPC ........ *G01S 5/02585* (2020.05); *G01S 5/0284* (2013.01); *G01S 5/0294* (2013.01); *G01S 5/14* (2013.01)

(58) Field of Classification Search
CPC .. G01S 5/02585; G01S 5/0284; G01S 5/0294; G01S 5/14
(Continued)

(56) References Cited

U.S. PATENT DOCUMENTS 12,000,946 B2* 6/2024 Kirchner ................. G01S 19/47
2023/0410384 A1* 12/2023 Pajouh ....................... G06T 7/73

FOREIGN PATENT DOCUMENTS

CN 109084760 A 12/2018
CN 116172605 A * 5/2023 ........... A61B 8/5215
(Continued)

OTHER PUBLICATIONS

Seong Yun Cho, "A Modified Residual-based Extended Kalman Filter to Improve the Performance of WiFi RSSI-based Indoor Positioning", Journal of Institute of Control, Robotics and Systems, 2015, vol. 21, No. 7, pp. 684-690. (7 pages total).
(Continued)

*Primary Examiner* — Harry K Liu
(74) *Attorney, Agent, or Firm* — Sughrue Mion, PLLC

(57) ABSTRACT

An electronic device includes a first sensor including an anchor and a tag, and a second sensor including an inertial sensor and a geo-magnetic sensor, and a processor configured to estimate a first relative position of an external electronic device based on a time of arrival at which a signal from the anchor arrives at the external device, estimate a first relative pose of the external electronic device, based on measurements of the inertial sensor and the geo-magnetic sensor, convert an acceleration of the electronic device in a sensor frame into an acceleration in a navigation frame,
(Continued)

based on the relative pose of the external electronic device, calculate a relative acceleration of the external device, based on the converted acceleration, and estimate a relative position and a relative pose of the external electronic device by applying the calculated relative position and the first relative position of the external electronic device to an Extended Kalman Filter.

20 Claims, 12 Drawing Sheets

(58) Field of Classification Search
USPC .......................................................... 342/458
See application file for complete search history.

(56) References Cited

FOREIGN PATENT DOCUMENTS

| KR | 10-2019-0023714 A | 3/2019 | |
|---|---|---|---|
| KR | 10-2216486 B1 | 2/2021 | |
| WO | WO-2020214708 A1 * | 10/2020 | ........... G01S 5/0284 |
| WO | 2020/248154 A1 | 12/2020 | |

OTHER PUBLICATIONS

Jongtaek Oh et al., "A Study on Estimating Smartphone Camera Position", The Journal of The Institute of Internet, Broadcasting and Communication (IIBC), vol. 21, No. 6, pp. 99-104, Dec. 31, 2021. (6 pages total).

Koo Changhoi et al., "An Implementation of Path Finding Service System Using BLE Based Indoor Location Estimation", 2015 Fall Academic Conference, the Korean Institute of Communications and Information Sciences. (7 pages total).

Young Soo Suh et al., "Orientation Estimation Using a Quaternion-Based Indirect Kalman Filter With Adaptive Estimation of External Acceleration", 2010 IEEE Transactions on Instrumentation and Measurement, vol. 59, No. 12, December 2010pp. 3296-3305. (10 pages total).

Ran Liu et al., "Cooperative Relative Positioning of Mobile Users by Fusing IMU Inertial and UWB Ranging Information" 2017 IEEE International Conference on Robotics and Automation (ICRA), May 29-Jun. 3, 2017, pp. 5623-5629. (7 pages total).

Kexin Guo t al., "Ultra-wideband based cooperative relative localization algorithm and experiments for multiple unmanned aerial vehicles in GPS denied environments", International Journal of Micro Air Vehicles 2017, vol. 9, No. 3, pp. 169-186. (18 pages total).

Charles Champagne Cossette et al., "Relative Position Estimation Between Two UWB Devices With IMUs", IEEE Robotics and Automation Letters, vol. 6, No. 3, Jul. 2021, pp. 4313-4320. (8 pages total).

Seol B. Bae et al., "A Design of a Simplified Hybrid Navigation System for a Mobile Robot by Using Kalman Filter", Iemek J. Embed. Sys. Appl., Oct. 2014, vol. 9, No. 5, pp. 299-305. (7 pages total).

* cited by examiner

FIG. 1
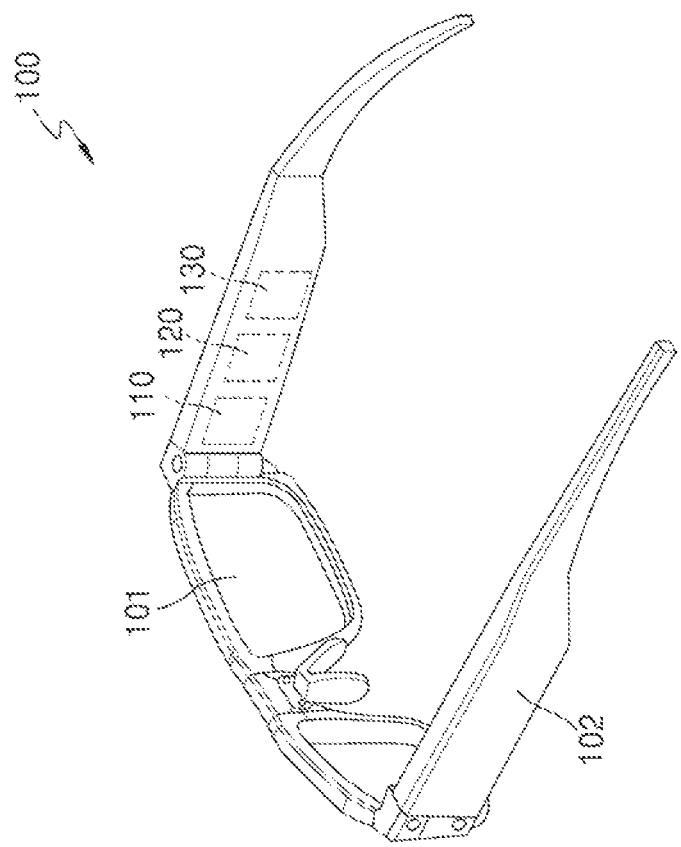
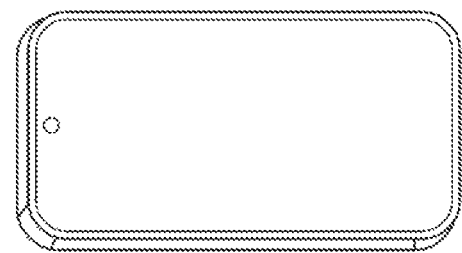

ELECTRONIC DEVICE FOR ESTIMATING RELATIVE POSITION AND POSE AND OPERATING METHOD OF THE SAME

CROSS-REFERENCE TO RELATED APPLICATION

This application is based on and claims priority under 35 U.S.C. § 119 to Korean Patent Application No. 10-2022-0080853, filed on Jun. 30, 2022, in the Korean Intellectual Property Office, the disclosure of which is incorporated by reference herein in its entirety.

BACKGROUND

1. Field

Embodiments of the disclosure relate to an electronic device for estimating relative position and pose and an operating method of the same.

2. Description of the Related Art

Augmented reality (AR) indicates a technology for representing virtual objects as if the objects exist in reality by augmenting the virtual objects in real images or backgrounds. AR may provide realistic and efficient information to users through images in which virtual objects or information are synthesized with reality, unlike virtual reality based on a virtual world, and therefore, interest in AR technology is gradually increasing.

For more realistic and efficient implementation of AR, it is important to accurately recognize AR elements or objects that may be displayed in AR. Particularly, AR is generally implemented through an electronic device (e.g., a mobile electronic device or a wearable electronic device), and in this case, to implement realistic AR, it is important to accurately recognize a relative position, a relative pose or the like of an external object (e.g., an external electronic device) relative to an electronic device configured to implement AR. Accordingly, there has been an increase in research on a method of precisely recognizing a relative position or a relative pose of an external object relative to an electronic device configured to implement AR.

In the related art, there has been proposed a method of estimating a relative position or a relative pose of an external object (e.g., an external electronic device) relative to an electronic device configured to implement augmented reality by using Wireless Fidelity (WiFi) or Bluetooth Low Energy (BLE) constructed in indoor circumstances. However, in the case of the method using WiFi or BLE, due to a great error range, it was difficult to accurately measure the relative position or the relative pose.

As an alternative thereto, there has been proposed a method of estimating a relative position or pose by using time of arrival at which a signal in an ultra-wide band (UWB) frequency band or using a range between an electronic device and an external object through an inertial sensor. However, even by the aforementioned methods, it was difficult to precisely estimate a relative position or a relative pose of an external object due to great influence by caused by external noise or rapid dispersion caused by accumulation of errors.

SUMMARY

Provided are an electronic device and a method by which a relative position and a relative pose of an external object may be precisely estimated by fusing a result of estimating the relative position of an external object through a signal in an ultra-wide band (UWB) frequency band and a result of estimating the relative position and the relative pose of an external object through an inertial sensor and a geo-magnetic sensor.

According to an aspect of the disclosure, an electronic device includes: a first sensor including at least one anchor configured to transmit a signal having a preset frequency, and a tag; a second sensor including an inertial sensor configured to measure an acceleration of the electronic device and an angular velocity of the electronic device, and a geo-magnetic sensor configured to measure a magnetic field around the electronic device; a memory storing at least one instruction; and a processor operatively connected to the first sensor and the second sensor. The processor is configured to execute the at least one instruction to: estimate a first relative position of the external electronic device relative to the electronic device, based on a time of arrival at which a signal transmitted from the at least one anchor arrives at the external electronic device; estimate a first relative pose of the external electronic device relative to the electronic device, based on a value measured by the inertial sensor and a value measured by the geo-magnetic sensor; convert an acceleration of the electronic device in a sensor frame, measured by the inertial sensor, into an acceleration of the electronic device in a navigation frame, based on the estimated relative pose of the external electronic device relative to the electronic device; calculate a relative acceleration of the external electronic device relative to the electronic device, based on the converted acceleration of the electronic device in the navigation frame; and estimate a relative position and a relative pose of the external electronic device relative to the electronic device by applying the calculated relative acceleration and the estimated first relative position of the external electronic device to an Extended Kalman Filter.

The first sensor may include: a first anchor disposed parallel to the tag; a second anchor spaced apart from the first anchor and disposed parallel to the tag; a third anchor disposed perpendicular to the tag; and a fourth anchor spaced apart from the third anchor and disposed perpendicular to the tag.

The first anchor, the second anchor, the third anchor, and the fourth anchor may be arranged radially with reference to the tag, and the tag may be arranged in the middle of the first anchor and the second anchor, and in the middle of the third anchor and the fourth anchor.

The processor may be further configured to execute the at least one instruction to: measure a range between the first anchor, the second anchor, the third anchor, the fourth anchor and a tag of the external electronic device, based on a time of arrival at which signals transmitted from the first anchor, the second anchor, the third anchor, and the fourth anchor arrive at the tag of the external electronic device; calculate, through a moving average filter, a moving average of the measured range between the first anchor, the second anchor, the third anchor, the fourth anchor and the tag of the external electronic device, after excluding a maximum value and a minimum value of the measured range between the first anchor, the second anchor, the third anchor, the fourth anchor and the tag of the external electronic device; and calculate the relative position of the external electronic device relative to the electronic device, based on the calculated moving average.

The processor may be further configured to execute the at least one instruction to: estimate the first relative position by applying, to the Extended Kalman Filter, the estimated relative position of the external electronic device relative to the electronic device.

The processor may be further configured to execute the at least one instruction to: estimate a pose and a gyro bias of the electronic device by applying, to a Kalman Filter, the value measured by the inertial sensor and the value measured by the geo-magnetic sensor.

The processor may be further configured to execute the at least one instruction to: calculate the relative acceleration of the external electronic device relative to the electronic device, based on a difference between the acceleration of the electronic device in the navigation frame and the acceleration of the external electronic device in the navigation frame obtained from the external electronic device.

The processor may be further configured to execute the at least one instruction to: estimate a second relative position of the external electronic device relative to the electronic device, based on the calculated relative acceleration of the external electronic device relative to the electronic device.

The processor may be further configured to execute the at least one instruction to: estimate the second relative position by performing a double integral with respect to the relative acceleration of the external electronic device relative to the electronic device.

The processor may be further configured to execute the at least one instruction to: fuse the first relative position and the second relative position through the Extended Kalman Filter.

The processor may be further configured to execute the at least one instruction to: apply the first relative position and the second relative position to the Extended Kalman Filter in which a relative position error, a relative velocity error, and a relative acceleration bias error of the external electronic device relative to the electronic device are set as state parameters.

The processor may be further configured to execute the at least one instruction to: estimate a relative position of the external electronic device relative to the electronic device based on the relative position, the relative velocity, and the relative acceleration bias of the external electronic device relative to the electronic device estimated through the Extended Kalman Filter.

According to an aspect of the disclosure, a method of estimating a relative position and a relative pose of an external electronic device relative to an electronic device, includes: estimating a first relative position of the external electronic device relative to the electronic device, based on a time of arrival at which a signal transmitted from at least one anchor of the electronic device arrives at the external electronic device; estimating a first relative pose of the external electronic device relative to the electronic device, based on a value measured by an inertial sensor of the external device and a value measured by a geo-magnetic sensor of the external device; converting an acceleration of the electronic device in a sensor frame, measured by the inertial sensor, into an acceleration of the electronic device in a navigation frame, based on the estimated relative pose of the external electronic device relative to the electronic device; calculating a relative acceleration of the external electronic device relative to the electronic device, based on the converted acceleration of the electronic device in the navigation frame; and estimating a relative position and a relative pose of the external electronic device relative to the electronic device by applying the relative acceleration and the estimated first relative position of the external electronic device, to an Extended Kalman Filter.

The estimating of the first relative position may include: measuring a range between a first anchor, a second anchor, a third anchor, a fourth anchor and a tag of the external electronic device based on a time of arrival at which the signals transmitted from the first anchor, the second anchor, the third anchor, and the fourth anchor arrive at a tag of the external electronic device; calculating, through a moving average filter, a moving average of the measured range between the first anchor, the second anchor, the third anchor, the fourth anchor and the tag of the external electronic device, after excluding a maximum value and a minimum value of the measured range between the first anchor, the second anchor, the third anchor, the fourth anchor and the tag of the external electronic device; calculating the relative position of the external electronic device relative to the electronic device based on the calculated moving average, and estimating the first relative position by applying the relative position of the external electronic device relative to the electronic device, to the Extended Kalman Filter.

The estimating of the relative pose of the external electronic device relative to the electronic device may include: estimating a pose and a gyro bias of the electronic device by applying, to a Kalman Filter, a value measured by the inertial sensor and a value measured by the geo-magnetic sensor.

The calculating of the relative acceleration of the external electronic device relative to the electronic device may include: calculating the relative acceleration of the external electronic device relative to the electronic device, based on a difference between the acceleration of the electronic device in the navigation frame and the relative acceleration of the external electronic device in the navigation frame obtained from the external electronic device.

The method may further include: estimating a second relative position of the external electronic device relative to the electronic device, based on the calculated relative acceleration of the external electronic device relative to the electronic device.

The calculating of the second relative position may include: estimating the second relative position by performing a double integral with respect to the relative acceleration of the external electronic device relative to the electronic device.

The estimating of the relative position and the relative pose of the external electronic device relative to the electronic device may include: applying the first relative position and the second relative position to the Extended Kalman Filter in which a relative position error, a relative velocity error, and a relative acceleration bias error of the external electronic device relative to the electronic device are set as state parameters.

The estimating of the relative position and the relative pose of the external electronic device relative to the electronic device may include: estimating the relative position of the external electronic device relative to the electronic device, based on a relative position, a relative velocity, and a relative acceleration bias of the external electronic device relative to the electronic device, which have been estimated through the Extended Kalman Filter.

The technical problems of the disclosure are not limited to the above-described description, and other technical problems may be clearly understood by one of ordinary skill in the art from the specification and the attached drawings.

Additional aspects will be set forth in part in the description which follows and, in part, will be apparent from the description, or may be learned by practice of the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a perspective view of an electronic device and an external electronic device, according to an embodiment;

DETAILED DESCRIPTION

Figure 2:
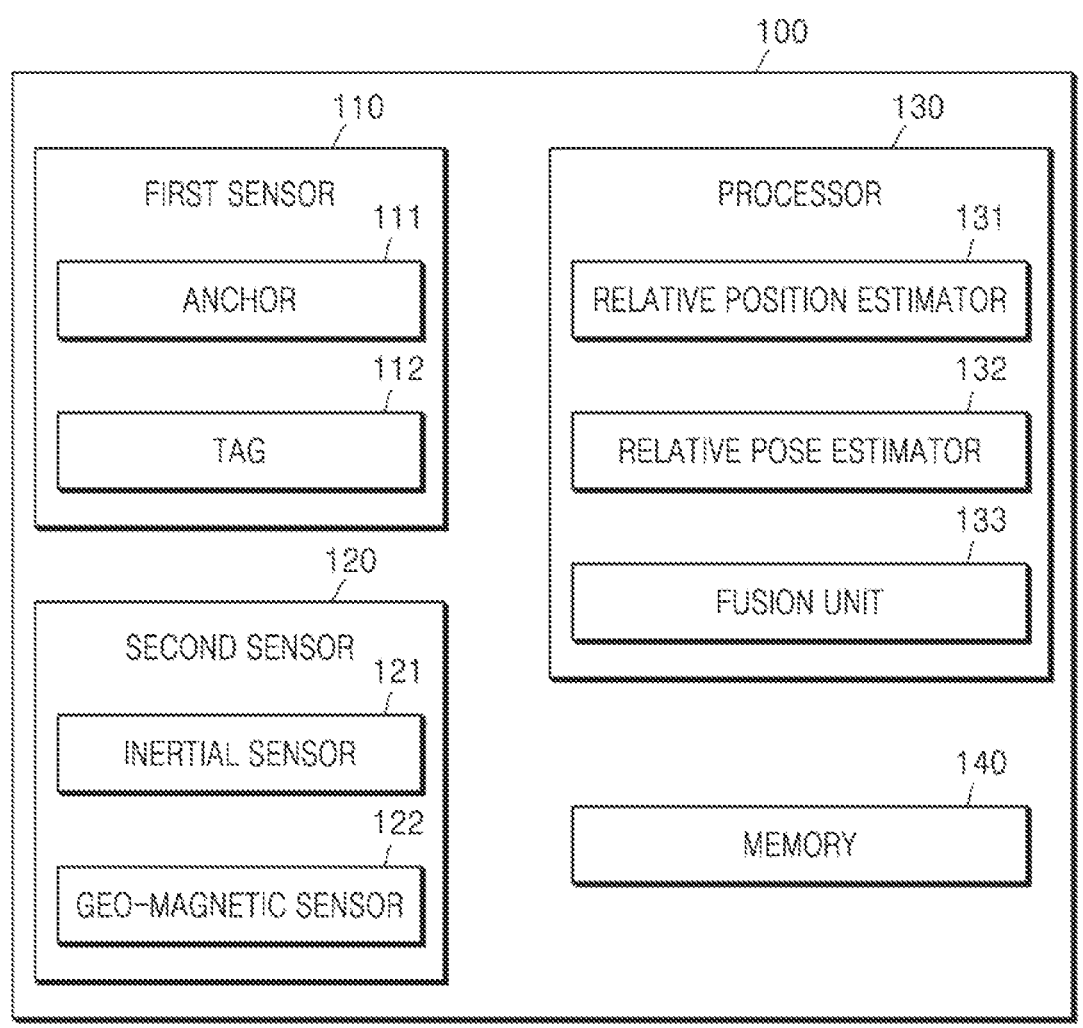
FIG. 2 is a block diagram of components of an electronic device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

Throughout the descriptions of embodiments, when an element is referred to as being "connected" or "coupled" to another element, it can be directly connected or coupled to the other element, or can be electrically connected or coupled to the other element with intervening elements interposed therebetween. The terms "comprises" and/or "comprising" or "includes" and/or "including" when used in this specification, specify the presence of stated elements, but do not preclude the presence or addition of one or more other elements.

Terms "configured" or "include" used herein should not be construed as necessary including all of several components or several steps written in the specification, but as not including some of the components or steps or as further including additional components or steps.

While such terms as "first", "second", etc., may be used to describe various components, such components must not be limited to the above terms. The above terms are used only to distinguish one component from another.

The descriptions of embodiments below should not be construed as limiting the right scope of the accompanying claims, and it should be construed that all of the technical ideas included within the scope equivalent to the claims are included within the right scope of embodiments. Exemplary embodiments of the disclosure will now be described more fully with reference to the accompanying drawings.

FIG. 1 is a perspective view of an electronic device and an external electronic device, according to an embodiment.

As shown in FIG. 1, an electronic device 100 according to an embodiment may estimate a relative position and a relative pose (or a relative attitude) of an external electronic device 200 (or an 'external object') with reference to the electronic device 100. Herein, the 'relative position' indicates a relative position of the external object with reference to a position of the electronic device 100, and the 'relative pose' may indicate a relative pose of the external object with reference to a pose of the electronic device 100.

The electronic device 100 may include a wearable electronic device including a lens 101, a connector 102 to be fixed to a portion of a user's body, a first sensor 110, a second sensor 120, a processor 130, and a memory 140.

The first sensor 110 may transmit a wireless signal to the external electronic device 200, receive a wireless signal from the external electronic device 200, and measure time of arrival (TOA) at which the wireless signal that has been transmitted arrives at the external electronic device 200. For example, the first sensor 110 may transmit a wireless signal in an ultra-wide band (UWB) frequency band to the external electronic device 200 through at least one anchor, and may measure TOA at which the wireless signal in the UWB frequency band arrives at the external electronic device 200. As another example, the external electronic device 200 may transmit a wireless signal to a tag of the first sensor 110.

The second sensor 120 may include an inertial sensor (or an 'inertial measurement unit (IMU)') configured to measure inertia information of the electronic device 100, and a geo-magnetic sensor configured to measure a magnetic field around the electronic device 100. The 'inertia information' may indicate information including velocity, an angular velocity, an acceleration, an angular acceleration, a pose, a direction, and the like, and these expressions may be used in same sense in the following descriptions.

The processor 130 is operatively connected to the first sensor 110 and/or the second sensor 120, and may estimate the relative position and the relative pose of the external electronic device 200 relative to the electronic device 100, based on values measured by the first sensor 110 and the second sensor 120. For example, the processor 130 may estimate the relative position and the relative pose of the external electronic device 200, based on TOA at which the wireless signal measured by the first sensor 110 arrives at the external electronic device 200 and values measured by the inertial sensor and the geo-magnetic sensor. However, the operation of estimating the relative position and the relative pose of the external electronic device 200 based on the values measured by the first sensor 110 and the second sensor 120 will be described in detail later.

The processor 130 may generate an augmented reality (AR) image based on the relative position and the relative pose of the external electronic device 200 and display the generated AR image through a lens 101 operated as a display. In this case, the user may fix the electronic device 100 to a portion of the body through the connector 102, and may see the AR image displayed on the lens 101 of the electronic device 100.

According to an embodiment, the electronic device 100 may include the memory 140. The memory 140 may store at least one of, but is not limited to, information about an acceleration, angular velocity, magnetic field, a first relative position, a second relative position, a relative pose, a relative acceleration, and/or other information associated with the electronic device 100 and/or external electronic device 200 for estimating a relative position and a relative pose of the external electronic device 200 relative to the electronic device 100. For example, the memory 140 may store at least one instruction, and the processor 130 may be configured to execute the at least one instruction to estimate a relative position and a relative pose of an external electronic device relative to an electronic device. The memory 140 referred herein may include at least one type of storage medium, from among a flash memory type storage medium, a hard disk type storage medium, a multi-media card micro type storage medium, a card type memory (e.g., an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The 'AR image' may indicate an image obtained by combination of an image of a real world around the electronic device 100 and a virtual image. For example, the AR image may indicate an image in which virtual images overlay the real world images, but is not limited thereto. In this case, the real world image indicates a real scene that may be seen by the user through the electronic device 100, and the real world image may include a real world object (e.g., the external electronic device 200). In addition, the virtual image may indicate an image that is formed by graphics processing and does not exist in the real world, and may include digital or virtual objects (i.e., AR object).

The electronic device 100 may include a wearable electronic device of a glasses type that may be mounted on the user's ears, as shown in FIG. 1, but is not limited thereto. In another embodiment, the electronic device 100 may include a wearable electronic device of a head-mount type that may be mounted on the user's head.

In addition, although the embodiments in which the electronic device 100 includes a wearable electronic device are described in the aforementioned embodiments, the field of application of the electronic device 100 is not limited thereto. For example, the electronic device 100 may be applied to a mobile electronic device capable of estimating a relative position and a relative pose of the external electronic device 200, a unmanned aerial vehicle (UAV), a robot, and/or an autonomous driving vehicle.

FIG. 2 is a block diagram of the components of the electronic device according to an embodiment.

Referring to FIG. 2, the electronic device 100 may include a first sensor 110 (e.g., the first sensor 110 shown in FIG. 1), a second sensor 120 (e.g., the second sensor 120 shown in FIG. 1), and a processor 130 (e.g., the processor 130 shown in FIG. 1).

The first sensor 110 may include at least one anchor 111 and a tag 112, which are configured to transmit/receive a wireless signal to/from an external electronic device (e.g., the external electronic device 200 shown in FIG. 1).

The at least one anchor 111 may transmit the wireless signal to the external electronic device and measure TOA at which the wireless signal arrives at the external electronic device. For example, the at least one anchor 111 may transmit the wireless signal and then measure TOA at which the wireless that has been transmitted arrives at a tag of the external electronic device, to thereby measure a range from the at least one anchor 111 and the tag of the external electronic device. Here, the wireless signal may be of an UWB frequency band to increase accuracy in measuring a range between devices, but is not limited thereto.

The tag 112 may include position information of the electronic device 100, and the external electronic device may obtain the position information of the electronic device 100 by transmitting/receiving the wireless signal to/from the tag 112. For example, the external electronic device may transmit/receive the wireless signal of the UWB frequency band to/from the tag 112, but a frequency of the wireless signal is not limited thereto.

The first sensor 110 may measure a range from the at least one anchor 111 to the external electronic device by an asymmetric two-way ranging method, but is not limited thereto. The first sensor 110 may measure the range from the at least one anchor 111 to the external electronic device by a time difference of arrival method or a two-way ranging method.

The second sensor 120 may include an inertial sensor 121 configured to measure inertia information of the electronic device 100, and a geo-magnetic sensor 122 configured to measure a magnetic force.

The inertial sensor 121 may measure inertia information of the electronic device 100, including a velocity, an angular velocity, an acceleration, an angular acceleration, a pose, a direction and the like of the electronic device 100, and the inertia information measured by the inertial sensor 121 may be transmitted to the processor 130.

The geo-magnetic sensor 122 may measure the magnetic field around the electronic device 100, and information regarding the magnetic field around the electronic device 100 measured by the geo-magnetic sensor 122 may be transmitted to the processor 130. Although FIG. 2 illustrates an embodiment in which the inertial sensor 121 and the geo-magnetic sensor 122 are separate components, according to an embodiment, the inertial sensor 121 and the geo-magnetic sensor 122 may be implemented as a single sensor.

The processor 130 may be operatively connected to the first sensor 110 and the second sensor 120, and may measure the relative position and the relative pose of the external electronic device relative to the electronic device 100, based on a value measured by the first sensor 110 and a value measured by the second sensor 120.

The processor 130 may include a relative position estimator 131, a relative pose estimator 132, and a fusion unit 133, which are configured to estimate the relative position and the relative pose of the external electronic device relative to the electronic device 100.

The relative position estimator 131 may estimate the relative position of the external electronic device relative to the electronic device 100, based on time of arrival at which a wireless signal measured by and transmitted from the at least one anchor 111 of the first sensor 110 arrives at the external electronic device. For example, the relative position estimator 131 may calculate the range from the at least one anchor 111 to the external electronic device based on the TOA of at least one wireless signal, and may estimate a first relative position of the external electronic device relative to the electronic device 100 from the calculated range from the at least one anchor 111 to the external electronic device. Here, the first relative position may indicate a three-dimensional position of the external electronic device relative to the electronic device 100.

The relative pose estimator 132 may estimate the relative position and a gyro bias of the external electronic device relative to the electronic device 100, based on values measured by the inertial sensor 121 and the geo-magnetic sensor 122 of the second sensor 120. For example, the relative pose estimator 132 may calculate roll, pitch, and yaw of the electronic device 100 by using the acceleration of the electronic device 100 measured by the inertial sensor 121 and the magnetic field around the electronic device 100 measured using the geo-magnetic sensor 122.

In addition, the relative pose estimator 132 may apply the calculated roll, pitch, and yaw of the electronic device 100 to a Kalman filter to estimate the relative pose and the gyro bias of the external electronic device relative to the electronic device 100.

The fusion unit 133 may estimate a second relative position of the external electronic device on the basis of the acceleration measured by the inertial sensor 121, and may fuse the first relative position and the second relative position of the external electronic device, which are estimated by the relative position estimator 131, through an Extended Kalman Filter (EKF), to estimate the relative position (or 'a final relative position') of the external electronic device.

For example, the fusion unit 133 may estimate the relative position of the external electronic device by applying the first relative position and the second relative position of the external electronic device, which have been estimated, to the EKF as measured values. In the EKF, a relative position error, a relative velocity error, and a relative acceleration bias error of the external electronic device relative to the electronic device 100 are set as state parameters.

In addition, the fusion unit 133 may apply the relative pose of the external electronic device, which is estimated by the relative pose estimator 132, to the EKF to estimate the relative pose of the external electronic device relative to the electronic device 100.

The fusion unit 133 may fuse, through the EKF, the first relative position of the electronic device estimated through the value measured by the first sensor 110 and the second relative position of the external electronic device estimated through the value measured by the second sensor 120, to thereby precisely estimate the relative position and/or the relative pose of the external electronic device relative to the electronic device 100.

The electronic device 100 may precisely estimate the relative position and/or the relative pose of the external electronic device through the aforementioned fusion unit 133, to thereby provide more real AR images to the users. Hereinafter, an operation of estimating the relative position and the relative pose of the external electronic device, which is performed by the electronic device 100, will be described in detail with reference to FIGS. 3 to 9.

Figure 3:
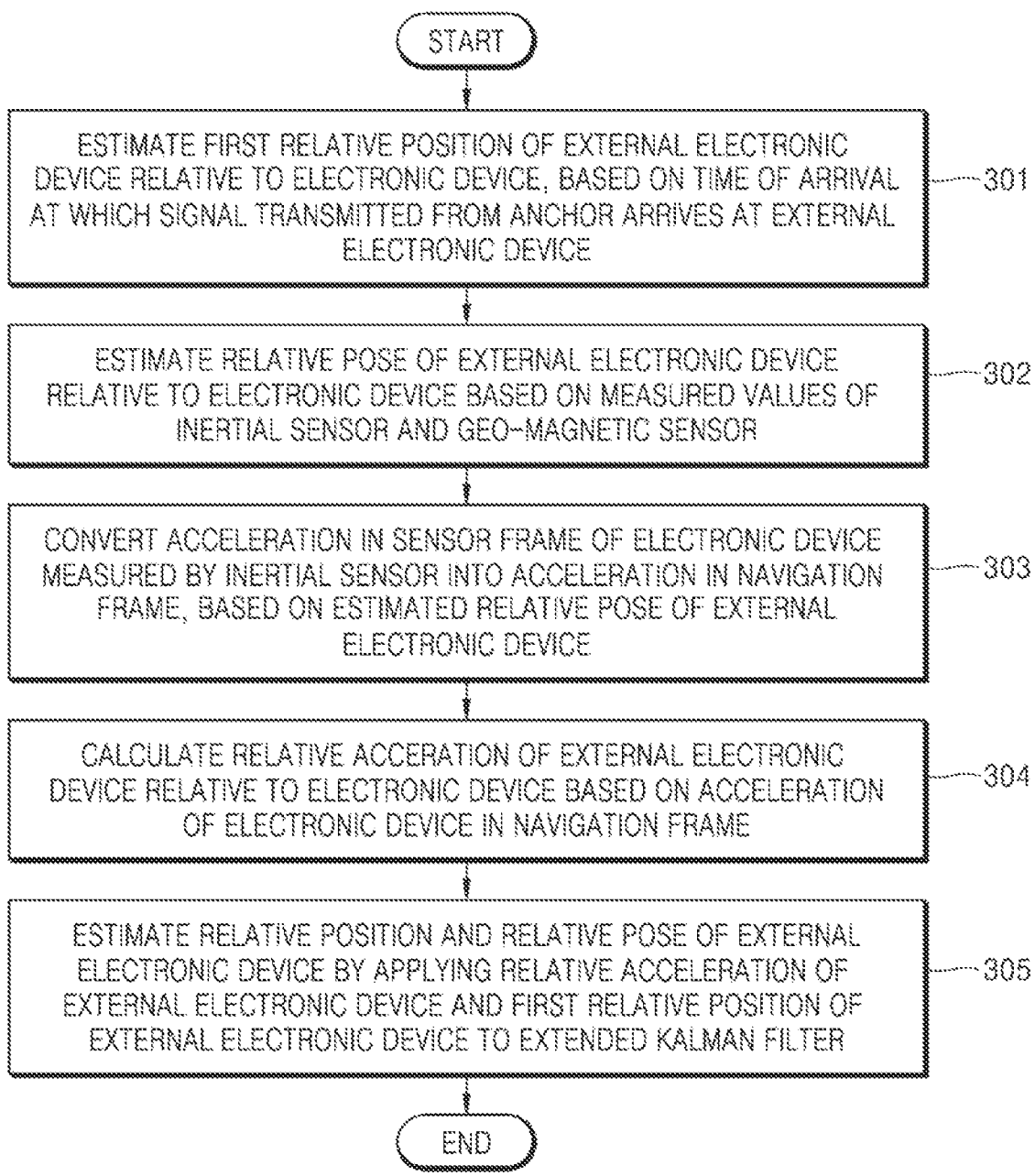
FIG. 3 is a flowchart illustrating operations to estimate a relative position and relative pose of an external electronic device relative to the electronic device shown in FIG. 2, according to an embodiment.

FIG. 3 is a flowchart illustrating operations to estimate the relative position and relative pose of the external electronic device relative to the electronic device shown in FIG. 2, according to an embodiment. Hereafter, operations shown in FIG. 3 to estimate the relative position and the relative pose of the external electronic device will be described with reference to the components shown in FIGS. 1 and 2.

Referring to FIG. 3, in operation 301, the electronic device 100 may estimate the first relative position of the external electronic device 200 relative to the electronic device 100, based on TOA at which the wireless signal measured by the first sensor 110 arrives at the external electronic device 200.

The relative position estimator 131 of the processor 130 may estimate the first relative position of the external electronic device 200 relative to the electronic device 100, based on TOA at which the wireless signal in the UWB frequency band, which is transmitted from the at least one anchor 111 of the first sensor 110, arrives at the external electronic device 200.

The relative position estimator 131 may calculate a three-dimensional relative position of the external electronic device 200 based on the range from the at least one anchor 111 to the external electronic device 200. In addition, the relative position estimator 131 may estimate the first relative position of the external electronic device 200 by applying the three-dimensional relative position of the external electronic device 200, which has been calculated, to the Kalman filter. For example, the relative position estimator 131 may estimate the first relative position of the external electronic device 200 by applying the calculated three-dimensional relative position of the external electronic device 200 as a measured value to the Kalman filter in which the relative position of the external electronic device 200 is set as a state parameter, and details thereof will be described later.

In operation 302, the processor 130 of the electronic device 100 according to an embodiment may estimate the relative pose of the external electronic device 200 relative to the electronic device 100, based on the value measured by the second sensor 120.

The relative pose estimator 132 of the processor 132 may calculate the roll and pitch of the electronic device 100 based on the values measured by the inertial sensor 121, and may calculate yaw of the electronic device 100 based on the value measured by the geo-magnetic sensor 122. In addition, the relative pose estimator 132 may estimate the relative pose of the external electronic device 200 relative to the electronic device 100 by applying the calculated roll, pitch, and yaw of the electronic device 100 as the measured values to the Kalman filter in which a pose error (or an 'Euler Angle Error') and a gyro bias error are set as state parameters.

In operation 303, the processor 130 of the electronic device 100 according to an embodiment may use the relative pose of the external electronic device 200, which is estimated in operation 302, to convert an acceleration of the electronic device 100 in a sensor frame, which has been measured by the inertial sensor 121, to an acceleration of the electronic device 100 in a navigation frame. In the disclosure, 'a sensor frame' indicates a coordinate system (or a body frame coordinate system) set with reference to the inertial sensor 121 moving along the electronic device 100, a navigation frame may indicate a coordinate system set with reference to a original point of an inertial navigation system or a point of a ground, and these expressions may be used as same meanings in the following.

The fusion unit 133 of the processor 130 may convert a value of the acceleration of the electronic device 100 in the sensor frame, which has been measured by the inertial sensor 121, into a value of the acceleration of the electronic device 100 in the navigation frame, through the relative pose of the external electronic device 200 estimated in operation 302.

In operation 304, the processor 130 of the electronic device 100 according to an embodiment may calculate a relative acceleration of the external electronic device 200 relative to the electronic device 100, based on the acceleration of the electronic device 100 in the navigation frame converted in operation 303.

The fusion unit 133 of the processor 130 may calculate the relative acceleration of the external electronic device 200 by differencing the acceleration of the electronic device 100 in the navigation frame, which is converted through operation 303, and the acceleration of the external electronic device 200. For example, the processor 130 may receive data regarding the acceleration of the external electronic device 200 in the navigation frame from the external electronic device 200, and may calculate the relative acceleration of the external electronic device 200 by differencing the acceleration of the electronic device 100 in the navigation frame, which is converted through operation 303, and the acceleration of the external electronic device 200 in the navigation frame. In this case, the external electronic device 200 may calculate the acceleration of the external electronic device 200 in the navigation frame through operations substantially identical or similar to operations 301 to 303 and transmit the calculated acceleration to the processor 130, but is not limited thereto.

In operation 305, the processor 130 of the electronic device 100 according to an embodiment may estimate the relative position and the relative pose of the external electronic device 200 relative to the electronic device 100 by applying, to the Kalman filter, the first relative position of the external electronic device 200 estimated in operation 301 and the relative acceleration of the external electronic device 200 calculated through operation 304.

The fusion unit 133 of the processor 130 may estimate the second relative position of the external electronic device 200 relative to the electronic device 100 through the relative acceleration of the external electronic device 200 relative to the electronic device 100 that is calculated through operation 304. For example, the fusion unit 133 may estimate the second relative position of the external electronic device 200 by performing a double integral with respect to the relative acceleration of the external electronic device 200. However, a method of estimating the second relative position of the external electronic device 200 is not limited to the embodiments.

In addition, the fusion unit 133 of the processor 130 may estimate an optimized relative position of the external electronic device 200 by fusing, through the EKF, the first relative position of the external electronic device 200 estimated in operation 301 and the second relative position of the external electronic device 200 estimated through the relative acceleration of the external electronic device 200. In the disclosure, 'the optimized relative position of the external electronic device' may indicate relative position data of which error is reduced through Kalman filtering (or 'optimal solution').

For example, the fusion unit 133 may estimate the relative position of the external electronic device 200 by applying, to the EKF, a difference between the first relative position and the second relative position of the external electronic device 200. In the EKF, the relative position error, the relative velocity error, and the relative acceleration bias error of the external electronic device 200 relative to the electronic device 100 are set as the state parameters.

In addition, the fusion unit 133 of the processor 130 may estimate an optimized relative pose of the external electronic device 200 by applying, to the EKF, the relative pose of the external electronic device 200 relative to the electronic device 100 estimated through operation 302. In the disclosure, 'the optimized relative pose of the external electronic device' may indicate relative pose data of which error is reduced through Kalman filtering, and this expression may be used as same meaning hereinafter.

Figure 4:
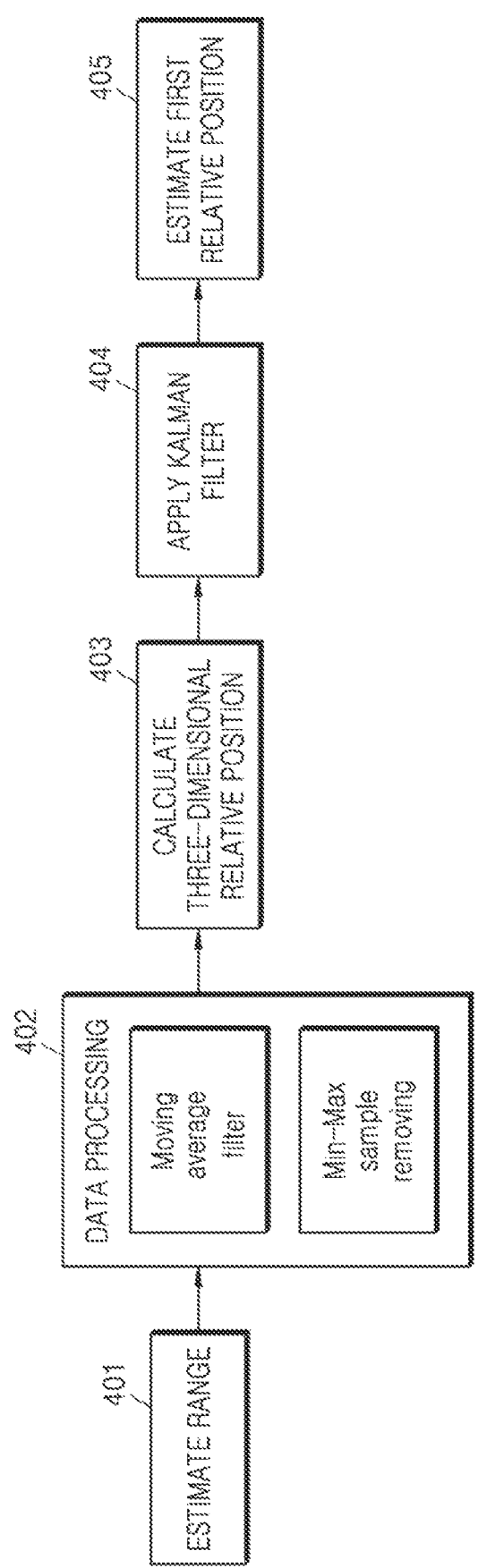
FIG. 4 is a block diagram illustrating an operation of estimating a relative position of an external electronic device by time of arrival, according to an embodiment.
Figure 5:
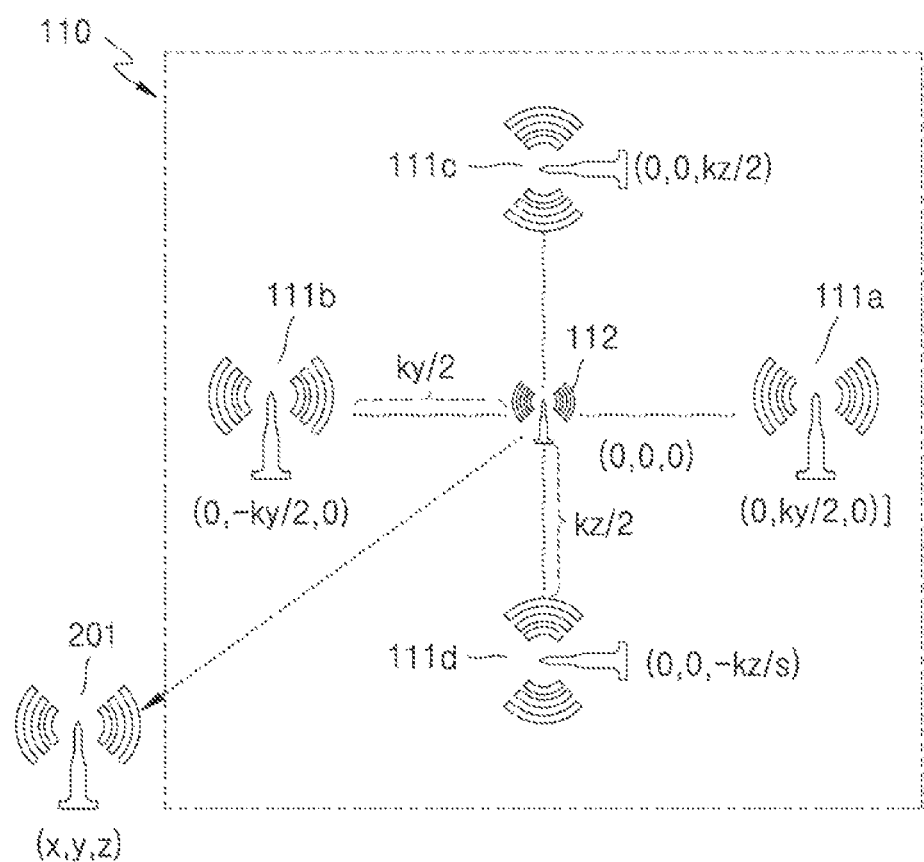
FIG. 5 is a diagram illustrating an operation of estimating a relative position of a tag of an external electronic device relative to an electronic device, according to an embodiment.

FIG. 4 is a block diagram illustrating an operation of estimating the relative position of the external electronic device based on time of arrival at which a signal transmitted from at least one anchor of the electronic device arrives at the external electronic device. In addition, FIG. 5 is a diagram illustrating an operation of estimating the relative position of the tag of the external electronic device relative to the electronic device through the first sensor of the electronic device, according to an embodiment. Hereinafter, operation 301 shown in FIG. 3 will be described in detail with reference to FIGS. 4 and 5.

Referring to FIG. 4, a processor (e.g., the processor 130 shown in FIGS. 1 and 2) of an electronic device (e.g., the electronic device 100 shown in FIGS. 1 and 2) may estimate the first relative position of the external electronic device relative to the electronic device, based on TOA at which the wireless signal measured by a first sensor (e.g., the first sensor 110 shown in FIGS. 1 and 2) arrives at an external electronic device (e.g., the external electronic device 200 shown in FIG. 1).

Referring to FIGS. 4 and 5, in operation 401, the processor 130 may measure a range from the at least one anchor 111 to a tag 201 of the external electronic device 200, based on an arrival signal at which the wireless signal transmitted from the at least one anchor 111 of the first sensor 110 arrives at the tag 201 of the external electronic device 200.

The at least one anchor 111 may include a first anchor 111a, a second anchor 111b, a third anchor 111c, and a fourth anchor 111d radially arranged with reference to the tag 112. For example, the tag 112 may be in the middle of the first anchor 111a and the second anchor 111b and the middle of the third anchor 111c and the fourth anchor 111d, and as a result, the first anchor 111a and the second anchor 111b may be symmetrically arranged with reference to the tag 112, and the third anchor 111c and the fourth anchor 112 may be symmetrically arranged with reference to the tag 112. In other words, the first anchor 111a, the second anchor 111b, the third anchor 111c, and the fourth anchor 111d may be arranged in a "+" shape with reference to the tag 112.

When the anchors are arranged perpendicular to the ground, transmission/reception efficiencies of wireless signals of the anchors are improved, and influence of noise may be reduced. Therefore, in the electronic device 100, the tag 112 may be arranged in a direction perpendicular to the ground and the first anchor 111a and the second anchor 111b may be arranged in a direction parallel to the tag 112 to improve the transmission/reception efficiencies of the wireless signals and reduce the influence of noise.

In this case, when all of the anchors 111a, 111b, 111c, and 111d, are arranged in the direction parallel to the tag 112, the wireless signal may fail to arrive some regions around the electronic device 100, or only a two-dimensional relative position of the tag 201 of the external electronic device 200 may be calculated. Therefore, unlike the first anchor 111a and the second anchor 111b, the third anchor 111c and the fourth anchor 111d may be arranged perpendicular to the tag 112, so that a three-dimensional relative position of the tag 201 of the external electronic device 200 may be calculated.

The electronic device 100 may precisely measure TOA at which wireless signals transmitted from the first anchor 111a, the second anchor 111b, the third anchor 111c, and the fourth anchor 111d arrive at the tag 201 of the external electronic device, through the aforementioned arrangement of the first anchor 111a, the second anchor 111b, the third anchor 111c, and the fourth anchor 111d.

According to the aforementioned arrangement of the first anchor 111a, the second anchor 111b, the third anchor 111c, and the fourth anchor 111d, when the tag 112 is set as an original point, a range between the first anchor 111a, the second anchor 111b, the third anchor 111c, the fourth anchor 111d and the tag 201 of the external electronic device 200 may be shown as Equation 1 below:

$$x^2 + \left(y - \frac{ky}{2}\right)^2 + z^2 = d_1^2$$
$$x^2 + \left(y + \frac{ky}{2}\right)^2 + z^2 = d_2^2$$
$$x^2 + y^2 + \left(z - \frac{kz}{2}\right)^2 = d_3^2$$
$$x^2 + y^2 + \left(z + \frac{kz}{2}\right)^2 = d_4^2$$

[Equation 1]

In Equation 1, x, y, z indicate coordinates of the tag 201 of the external electronic device 200 relative to the tag 201, $d_n$ indicates a range between an $n^{th}$ anchor (where n is a natural number) and the tag 201, $k_y$ may indicate a range between the first anchor 111a and the second anchor 111b, and $k_z$ may indicate a range between the third anchor 111c and the fourth anchor 111d.

The processor 130 may measure, by the asymmetric two-way ranging method, the range between the first anchor 111a, the second anchor 111b, the third anchor 111c, and the fourth anchor 111d and the tag 201 of the external electronic device 200, based on TOA at which the wireless signals transmitted from the first anchor 111a, the second anchor 111b, the third anchor 111c, and the fourth anchor 111d arrives at the tag 201 of the external electronic device 200.

Here, the first anchor 111a and the second anchor 111b are symmetrically arranged with reference to the tag 112, and the third anchor 111c and the fourth anchor 111d are also symmetrically arranged with reference to the tag 112. Accordingly, an equation (e.g., Equation 1) for calculating the range between the first anchor 111a, the second anchor 111b, the third anchor 111c, the fourth anchor 111d and the tag 201 of the external electronic device 200 may become simple, and an amount of operation of the processor 130 may be reduced. Accordingly, the processor 130 may promptly calculate the range between the first anchor 111a, the second anchor 111b, the third anchor 111c, and the fourth anchor 111d and the tag 201 of the external electronic device 200.

In operation 402, the processor 130 may repeatedly measure the range between the first anchor 111a, the second anchor 111b, the third anchor 111c, the fourth anchor 111d and the tag 201 of the external electronic device 200, the range measured through operation 401, and may process measured range data.

For example, noise included in the wireless signals may cause errors to TOA of the wireless signals, and as a result, errors may also occur in the data regarding the range between the first anchor 111a, the second anchor 111b, the third anchor 111c, the fourth anchor 111d and the tag 201 of the external electronic device 200, which is measured through operation 401.

The processor 130 may perform data processing on data obtained through repetition of operation 401 to reduce an error of the range between the first anchor 111a, the second anchor 111b, the third anchor 111c, the fourth anchor 111d and the tag 201 of the external electronic device 200, which is generated due to the noise included in the wireless signal.

For example, the processor 130 may exclude a maximum value and a minimum value from the data regarding the range between the first anchor 111a, the second anchor 111b, the third anchor 111c, the fourth anchor 111d, and the tag 201 of the external electronic device 200 measured by repetition of operation 401. In addition, the processor 130 may apply a moving average filter to the range data from which the maximum value and the minimum value are excluded, to calculate a movement average of the range between the first anchor 111a, the second anchor 111b, the third anchor 111c, the fourth anchor 111d and the tag 201 of the external electronic device 200.

$$MA(\text{Moving Average}) = \frac{\ddot{d}_1 + \ddot{d}_2 + \cdots \ddot{d}_n}{n}$$

[Equation 2]

The movement average of the range between the first anchor 111a, the second anchor 111b, the third anchor 111c, the fourth anchor 111d and the tag 201 of the external electronic device 200 may be calculated by Equation 2, and in Equation 2, $\ddot{d}_n$ indicates $n^{th}$ range data, and n indicates the number of data except the maximum value and the minimum value from the range data measured through repetition of operation 401.

In operation 403, the processor 130 may calculate the three-dimensional relative position of the external electronic device 200 relative to the electronic device 100, based on the movement average of the range between the first anchor 111a, the second anchor 111b, the third anchor 111c, the fourth anchor 111d, and the tag 201 of the external electronic device 200, which is calculated through operation 402. For example, the processor 130 may calculate, by Equation 3, the relative position of the tag 201 of the external electronic device 200 relative to the tag 112 of the electronic device 100.

$$x = \sqrt{d_1^2 - \left(y + \frac{ky}{2}\right)^2 - z^2}$$
$$y = \frac{d_1^2 - d_2^2}{4 * ky/2}$$
$$z = \frac{d_4^2 - d_3^2}{4 * kz/2}$$

[Equation 3]

In Equation 3, x, y, and z indicate a coordinate value of the tag 201 of the external electronic device 200 relative to the tag 112 of the first sensor 110, which is induced through Equation 1. The processor 130 may calculate the three-dimensional relative position of the tag 201 of the external electronic device 200 (hereinafter, referred to as the three-dimensional relative position of the external electronic device 200') relative to the tag 112 of the first sensor 110 by applying, to Equation 3, a range $d_1$ between the first anchor 111a and the tag 201 of the external electronic device 200, a range $d_2$ between the second anchor 111b and the tag 201 of the external electronic device 200, a range $d_3$ between the third anchor 111c and the tag 201 of the external electronic device 200, and a range $d_4$ between the fourth anchor 111d and the tag 201 of the external electronic device 200.

In operation 404, the processor 130 may apply the Kalman filter to the third relative position of the external electronic device 200 calculated in operation 403. For example, the processor 130 may minimize or optimize an error of the relative position of the external electronic device 200 relative to the electronic device 100 by applying the three-dimensional relative position of the external electronic device 200, which is calculated in operation 403, as a measure value to the Kalman filter in which the relative position of the external electronic device 200 relative to the electronic device 100 is set as a state parameter.

In operation 405, the processor 130 may estimate the first relative position of the external electronic device 200 relative to the electronic device 100 through optimization using Kalman filter in operation 404, and the first relative position of the external electronic device 200, which has been estimated, may be stored in the processor 130 (or memory).

Figure 6:
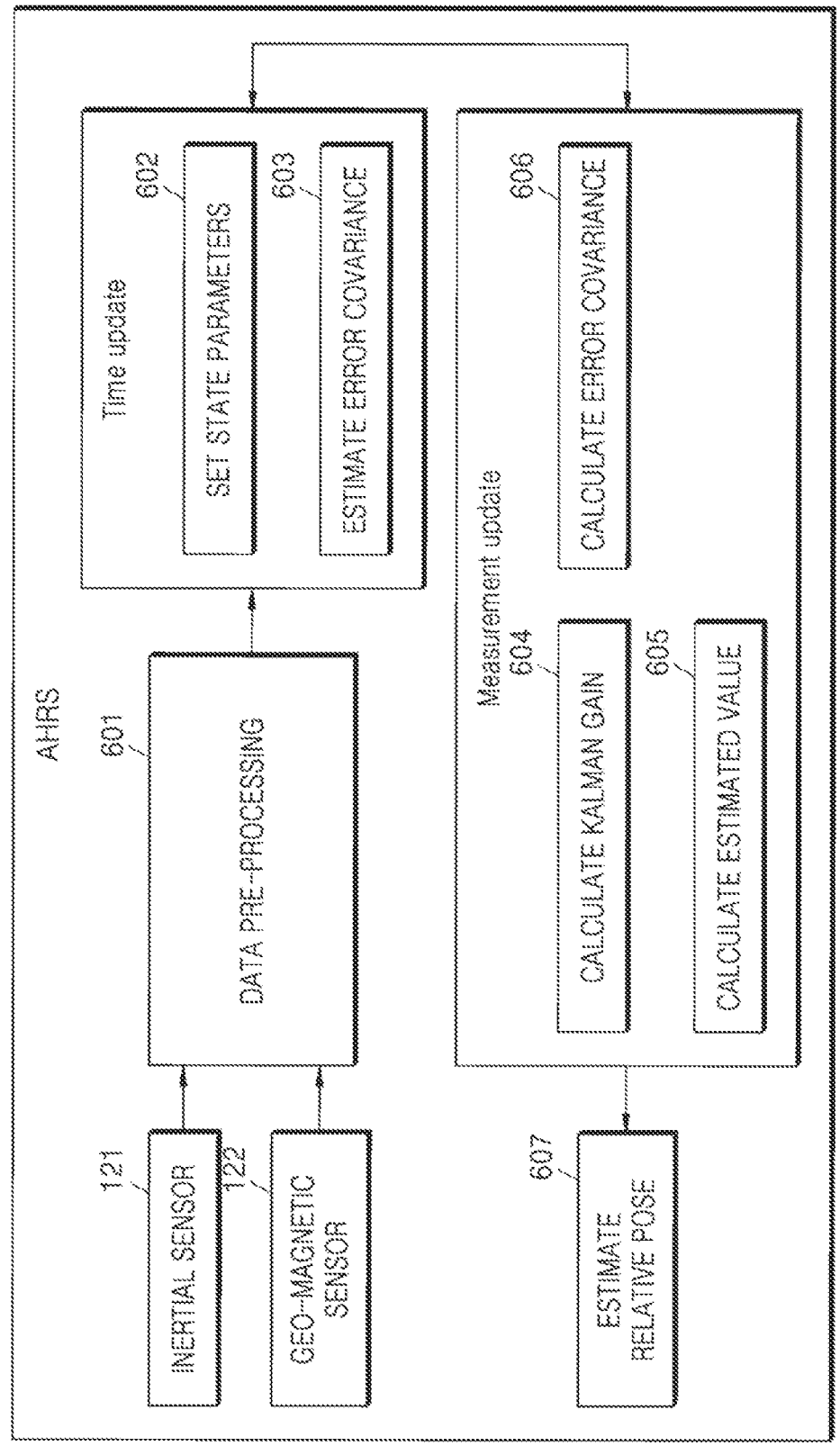
FIG. 6 is a block diagram illustrating an operation of estimating a relative pose of an external electronic device relative to an electronic device, according to an embodiment.
Figure 7A:
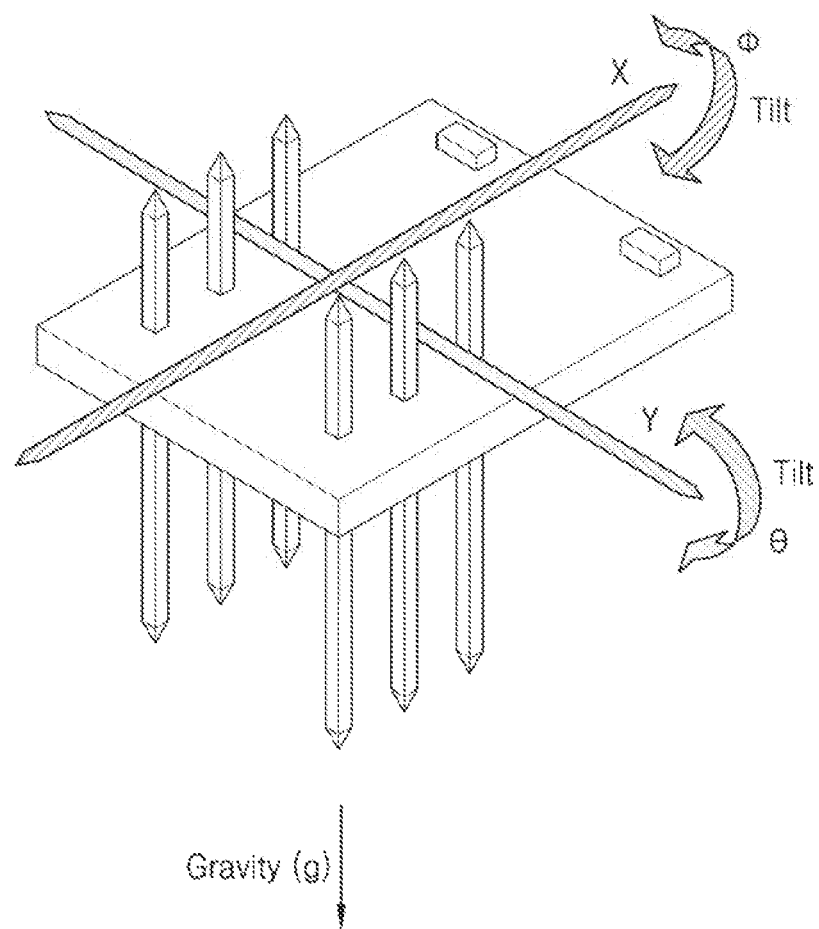
FIG. 7A is a diagram illustrating an operation of estimating a roll value and a pitch value of an electronic device, according to an embodiment.
Figure 7B:
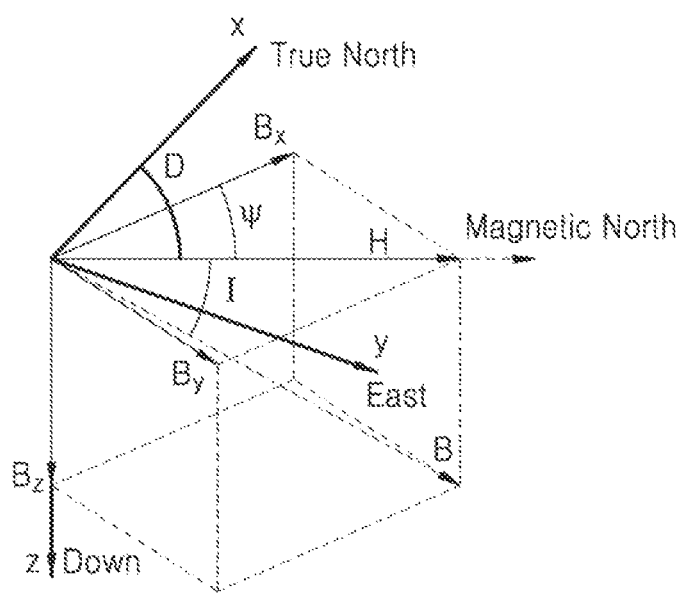
FIG. 7B is a diagram illustrating an operation of estimating a yaw value of an electronic device, according to an embodiment.

FIG. 6 is a block diagram illustrating an operation of estimating a relative pose of an external electronic device relative to an electronic device, based on values measured by an inertial sensor and a geo-magnetic sensor of an electronic, according to an embodiment. In addition, FIG. 7A is a diagram illustrating an operation of estimating a roll value and a pitch value of an electronic device, based on a value measured by an inertial sensor, according to an embodiment, and FIG. 7B is a diagram illustrating an operation of estimating a yaw value of an electronic device based on a value measured by a geo-magnetic sensor, according to an embodiment. Hereinafter, operation 302 shown in FIG. 3 will be described in detail with reference to FIGS. 6, 7A, and 7B.

Referring to FIG. 6, the processor (e.g., the processor 130 shown in FIGS. 1 and 2) of the electronic device (e.g., the electronic device 100 shown in FIGS. 1 and 2) according to an embodiment may estimate the relative pose of the external electronic device (e.g., the external electronic device 200 shown in FIG. 1) relative to the electronic device based on the values measured by the inertial sensor 121 and the geo-magnetic sensor 122.

The processor 130 may estimate the relative pose of the external electronic device 200 relative to the electronic device 100 through an attitude heading reference system (AHRS) including the inertial sensor 121 and the geo-magnetic sensor 122.

In operation 601, the processor 130 may perform pre-processing (or 'data purification') regarding the data measured (or 'the value measured') by the inertial sensor 121 and the geo-magnetic sensor 122. For example, the processor 130 may perform an operation of excluding an error or an abnormal value included in the measured value of the inertial sensor 121 and/or the geo-magnetic sensor 122 and/or an operation of setting an initial value, but the pre-processing is not limited to the aforementioned embodiments.

The processor 130 may perform a time update operation of predicting a state including a pose and a gyro bias of the electronic device 100 based on the data pre-processed through operation 601.

In operation 602, through Equation 4, the processor 130 may set the pose error $\delta\phi$ and the gyro bias error $\delta B_g$ of the electronic device 100, which are to be estimated through the Kalman filter, as the state parameters. A 'relative pose error' may refer to an Euler Angle Error such as roll, pitch, and yaw of the electronic device 100, and the relative pose error may be referred to as the Euler Angle Error.

$$\widehat{x_k} = F\widehat{x_{k-1}} + Bu_k \qquad \text{[Equation 4]}$$

$$F = \begin{bmatrix} I_3 & -C_b^n \cdot \Delta t \\ 0_3 & I_3 \end{bmatrix}$$

In Equation 4, $\widehat{x_k}$ indicates a state parameter estimated at a $k^{th}$ step, F indicates a state transition matrix, $C_b^n$ and $C_n^b$ to be described later indicate direction cosine matrixes, and $\Delta t$ indicates a sampling time. Here, the state transition matrix F may be predetermined in the Kalman filter.

After setting the pose error $\delta\phi$ and the gyro bias error $\delta B_g$ as the state parameters through operation 602, in operation 603, the processor 130 may predict an error covariance $P_k$ through Equation 5.

$$P_k = FP_{k-1}F^T + Q \qquad \text{[Equation 5]}$$

In Equation 5, $P_k$ indicates an error covariance at a $k^{th}$ step, and Q indicates noise.

After predicting the state parameters including the pose and the gyro bias of the electronic device 100 through the operations 601 and 602, the processor 130 may perform a measurement update operation of updating the predicted state parameters on the basis of measurements of the inertial sensor 121 and the geo-magnetic sensor 122.

In operation 604, the processor 130 may calculate a Kalman gain ($K_k$) of the Kalman filter by applying the error covariance $P_k$, which is predicted through operation 603, to Equation 6.

$$K_k = P_k H^T S^{-1}$$

$$S = HP_k H^T + R \qquad \text{[Equation 6]}$$

In Equation 6, H indicates a measurement matrix, $K_k$ indicates a kalman gain at the kth step, and R indicates noise. Here, the measurement matrix H may include a predetermined matrix in the Kalman filter, like the state shift matrix F.

In operation 605, the processor 130 may calculate a pose error and a gyro bias error of the electronic device 100, which are estimated values, based on the Kalman gain ($K_k$) calculated through operation 604 and a pose (or an 'Euler Angle') of the electronic device 100 calculated through the inertial sensor 121 and the geo-magnetic sensor 122.

The processor 130 may calculate roll, pitch, and yaw values of the electronic device 100 through the Kalman gain ($K_k$) calculated through operation 603 and the measured values of the inertial sensor 121 and the geo-magnetic sensor 122, and may estimate the pose error and the gyro bias error by applying, to the Kalman filter, the calculated roll, pitch, and yaw values of the electronic device 100 as measured values.

Referring to FIG. 7A, in an embodiment, the processor 130 may calculate values of the roll (ø) and the pitch (θ) of the electronic device 100 based on values measured by the inertial sensor 121 in a state at which the electronic device 100 is paused. For example, the processor 130 may calculate the values of the roll (ø) and the pitch (θ) of the electronic device 100 by applying the acceleration value of the electronic device 100, which is measured by the inertial sensor 121, to Equation 7 and Equation 8.

$$f^b = \begin{bmatrix} f_x \\ f_y \\ f_z \end{bmatrix} = c_n^b \begin{bmatrix} 0 \\ 0 \\ -g \end{bmatrix} = \begin{bmatrix} g\sin\theta \\ -g\sin\phi\cos\theta \\ -g\cos\phi\cos\theta \end{bmatrix} \quad \text{[Equation 7]}$$

$$\phi = \tan^{-1}\left(\frac{f_y}{f_z}\right), \theta = \tan^{-1}\left(\frac{f_x}{\sqrt{f_y^2 + f_z^2}}\right) \quad \text{[Equation 8]}$$

In equation 7 and Equation 8, $f_x$, $f_y$, and $f_z$ indicate accelerations applied to the electronic device 100 or the x axis, y axis, and z axis of the inertial sensor 121.

Referring to FIG. 7B, in another example, when there is not external geo-magnetic disturbance, the processor 130 may calculate the yaw (ψ) value of the electronic device 100 through the value measured by the geo-magnetic sensor 122. For example, the processor 130 may calculate the yaw (ψ) value of the electronic device 100 by applying a magnetic field value around the electronic device 100, which is measured through the geo-magnetic sensor 122, to Equation 9 and Equation 10.

$$\begin{bmatrix} B_x \\ B_y \\ B_z \end{bmatrix} = \begin{bmatrix} \cos\theta & \sin\phi\sin\theta & \cos\phi\sin\theta \\ 0 & \cos\phi & -\sin\phi \\ -\sin\theta & \sin\phi\cos\theta & \cos\phi\cos\theta \end{bmatrix} \begin{bmatrix} m_x \\ m_y \\ m_z \end{bmatrix} \quad \text{[Equation 9]}$$

$$\psi = \tan^{-1}\left(-\frac{B_y}{B_x}\right) + D \quad \text{[Equation 10]}$$

In Equation 9 and Equation 10, $B_x$, $B_y$, and $B_z$ are magnetic fields applied to the x axis, y axis, and z axis around the electronic device 100, and D indicates a declination angle that is an angle between true north and magnetic north.

The processor 130 may calculate the pose error and the gyro bias error of the electronic device 100, which is the measured value of the Kalman Filter, by applying, to the Kalman Filter, the roll, pitch, and yaw values of the electronic device 100 calculated through Equations 7 to 10 as the measured values. For example, the processor 130 may calculate the pose error and the gyro bias error of the electronic device 100 in the k+1$^{th}$ step by applying the roll, pitch, and yaw values of the electronic device 100 calculated at the k$^{th}$ step to Equation 11.

$$\widehat{x_{k+1}} = \widehat{x_k} + K_k(z_k - H\widehat{x_k}) \quad \text{[Equation 11]}$$

$$z_k = Hx_k + v_k = \left[ f^b - c_n^b * f_{ref} \ m^b - c_n^b * M_{ref} \right]$$

$$H = \begin{bmatrix} H_{11} & O_3 \\ H_{21} & O_3 \end{bmatrix}$$

In Equation 11, $x_k$ indicates a measurement at the k$^{th}$ step, and $v_k$ indicates measurement noise at the k$^{th}$ step. For example, $x_k$ may include roll, pitch, and yaw values of the electronic device 100 calculated through the values measured by the inertial sensor 121 and the geo-magnetic sensor 122 at the k$^{th}$ step. In addition, $M_{ref}$ indicates a geo-magnetic field reference of a current position (latitude and longitude), $H_{11}$ indicates $c_n^b *\text{skew}(f_{ref})$, $f_{ref}$ indicates $[0\ 0\ -g]^T$, and $H_{21}$ indicates $c_n^b *\text{skew}(M_{ref})$.

In operation 606, the processor 130 may calculate an error covariance based on a Kalman gain calculated through operation 604. For example, the processor 130 may calculate an error covariance at a k+1$^{th}$ step by applying, to Equation 12, the Kalman gain at the k$^{th}$ step calculated through operation 604.

$$P_{k+1} = (I - K_k H)P_k \quad \text{[Equation 12]}$$

In operation 607, the processor 130 may estimate a second relative position of the external electronic device 200 relative to the electronic device 100 based on the pose error and the gyro bias error of the electronic device 100, which are reduced as possible, by repeatedly performing operation 602 to operation 606. For example, the processor 130 may estimate the relative pose of the external electronic device 200 by differencing a pose of the electronic device 100 and a pose of the external electronic device 200 calculated through operation 602 to operation 606.

Here, the pose of the external electronic device 200 may include a pose of the external electronic device 200 estimated through the processor 130 of the external electronic device 200, and the pose of the external electronic device 200 estimated by the external electronic device 200 may be transmitted from the processor 130 through a wireless signal. For example, the external electronic device 200 may estimate the pose of the external electronic device 200 by performing operation 601 to operation 606 described above, and the estimated pose of the external electronic device 200 may be transmitted to the processor 130 of the electronic device 100.

Figure 8:
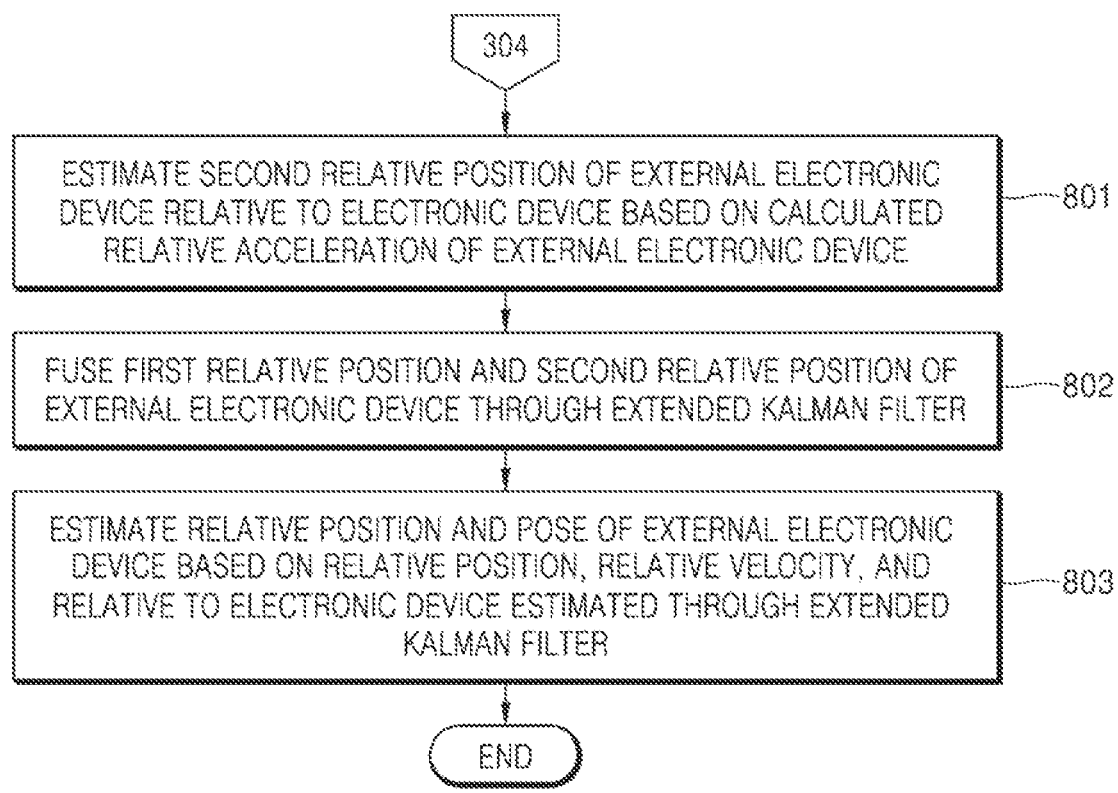
FIG. 8 is a flowchart illustrating an operation of estimating a relative position and a relative pose of an external electronic device, according to an embodiment.

FIG. 8 is a flowchart illustrating an operation of estimating a relative position and a relative pose of an external electronic device, by fusing a relative position of an external electronic device, which is estimated through a first sensor of an electronic device, and a relative position and a relative pose of an external electronic device estimated through a second sensor, according to an embodiment.

Hereinafter, operation 305 shown in FIG. 3 will be described in detail with reference to FIG. 8 and with reference to the components shown in FIGS. 1 and 2.

In operation 801, the processor 130 of the electronic device 100 may estimate the second relative position of the external electronic device 200 relative to the electronic device 100 based on the relative acceleration of the external electronic device 200 calculated through operation 304 shown in FIG. 3. For example, the processor 130 may estimate the second relative position of the external electronic device 200 relative to the electronic device by performing a double integral with respect to the relative acceleration of the external electronic device 200.

In operation 802, the processor 130 of the electronic device 100 may fuse, through the EKF, the first relative position of the external electronic device 200 estimated through operation 301 shown in FIG. 3 and the second relative position of the external electronic device 200 estimated through operation 801.

The processor 130 may estimate the relative position, the relative velocity, and the relative acceleration of the external electronic device relative to the electronic device 100 by applying, as measured values, the first relative position and the second relative position to the EKF in which the relative position error, the relative velocity error, and the relative acceleration bias error of the external electronic device 200 relative to the electronic device 100 are set as the state parameters. For example, the processor 130 may estimate the relative position, the relative velocity, and the relative acceleration bias by applying, as the measurement, the difference between the first relative position and the second relative position of the external electronic device 200 to the EKF.

In operation 803, the processor 130 may estimate the relative position and the relative pose of the external electronic device 200 relative to the electronic device 100, based on the relative position, the relative velocity, and the relative acceleration bias of the external electronic device 200 relative to the electronic device 100, which are estimated through the EKF in operation 802.

In an example, the processor 130 may estimate an optimal relative position of the external electronic device 200 through the relative position, the relative velocity, and the relative acceleration bias of the external electronic device 200 relative to the electronic device 100, which are estimated through EKF.

In another example, the processor 130 may estimate an optimal relative pose of the external electronic device 200 relative to the electronic device by applying, to the EKF, the relative position of the external electronic device 200 estimated by operation 302 shown in FIG. 3.

The electronic device 100 according to an embodiment may precisely estimate the relative position of the external electronic device 200 by using the EKF in which the relative position error of the external electronic device 200 is set as the state parameter through the operations 801 to 803.

For example, in the case of an existing EKF in which a range between the electronic device 100 and the external electronic device 200 is set as the state parameter, only the range between the electronic device 100 and the external electronic device 200 may be estimated, and it may be difficult to accurately estimate the relative position of the external electronic device 200.

On the other hand, the electronic device 100 may estimate the relative position of the external electronic device 200 through the first sensor 110 and the second sensor 120, and may apply, as the measured value, the estimated relative position of the external electronic device 200 to the EKF in which the relative position error is set as the state parameter, and by doing so, may accurately estimate the relative position of the external electronic device 200 as well as the range between the electronic device 100 and the external electronic device 200.

Hereinafter, operations 304 and 305 shown in FIG. 3 will be described in detail with reference to FIG. 9.

Figure 9:
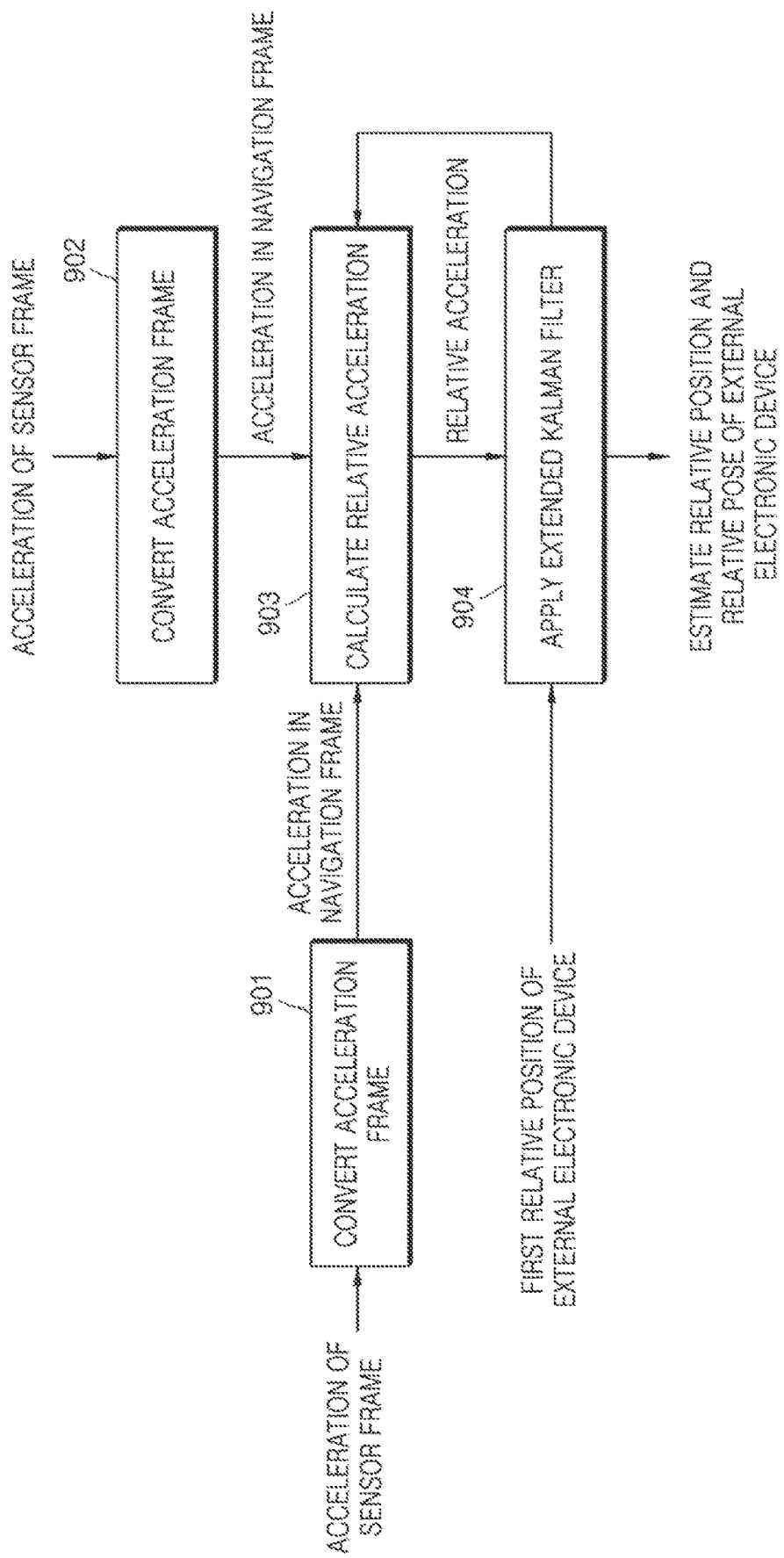
FIG. 9 is a block diagram illustrating an operation of fusing a relative position of an external electronic device estimated through a first sensor and a relative position and a relative pose of an external electronic device estimated through a second sensor, according to an embodiment.

FIG. 9 is a block diagram illustrating an operation of fusing a relative position of an external electronic device estimated through a first sensor and a relative position and a relative pose of an external electronic device estimated through a second sensor, through an Extended Kalman Filter of an electronic device, according to an embodiment.

Referring to FIG. 9, in operation 901, the processor (e.g., the processor 130 shown in FIGS. 1 and 2) of the electronic device (e.g., the electronic device 100 shown in FIGS. 1 and 2) may convert the acceleration of the electronic device in the sensor frame, which is obtained from an inertial sensor (e.g., the inertial sensor 121 shown in FIG. 2), into the acceleration on the navigation frame. For example, to calculate the relative acceleration of an external electronic device, a fusion unit (e.g., the fusion unit 133 shown in FIG. 2) of the processor 130 may convert the acceleration on the sensor frame of the electronic device 100, which is obtained from the inertial sensor 121, into the acceleration on the navigation frame.

In operation 902, substantially identical or similar to operation 901 performed by the processor 130, the external electronic device (e.g., the external electronic device 200 shown in FIG. 1) may convert the acceleration in the sensor frame of the external electronic device 200, which is measured through an inertial sensor of the external electronic device 200, into the acceleration in the navigation frame. Here, data regarding the acceleration in the navigation frame of the external electronic device 200 converted through operation 902 may be transmitted to the processor 130 of the electronic device 100.

In operation 903, the processor 130 of the electronic device 100 may calculate the relative acceleration of the external electronic device 200 relative to the electronic device 100, based on the acceleration on the navigation frame of the electronic device 100 converted through operation 901 and the acceleration on the navigation frame of the external electronic device 200 converted through operation 902. For example, the processor 130 may calculate the relative acceleration of the external electronic device 200 relative to the electronic device 100 by differencing the acceleration of the electronic device 100 in the navigation frame and the acceleration of the external electronic device 200 in the navigation frame.

The electronic device 100 may convert the acceleration of the electronic device 100 in the sensor frame into the acceleration in the navigation frame and convert the acceleration of the external electronic device 200 in the sensor frame into the acceleration in the navigation frame, and by doing so, the electronic device 100 may calculate the relative acceleration of the external electronic device 200 only by differencing the two accelerations.

For example, when using the acceleration in the sensor frame, the sensor frame of the electronic device 100 is different from the sensor frame of the external electronic device 200, and therefore, it is unable to calculate the difference between the acceleration of the sensor frame of the electronic device 100 and the acceleration of the sensor frame of the external electronic device 200. In contrast, the electronic device 100 according to an embodiment may easily calculate the relative acceleration of the external electronic device 200 only by differencing the acceleration of the electronic device 100 and the external electronic device 200 by unifying the acceleration of the electronic device 100 and the acceleration of the external electronic device 200 into the navigation frame through operation 901 and operation 902 described above.

In operation 904, the processor 130 of the electronic device 100 may estimate the relative position and the relative pose of the external electronic device 200 relative to the electronic device 100 by applying, to the EKF, the first relative position estimated through operation 301 shown in FIG. 3 and the relative acceleration of the external electronic device 200 calculated through operation 903.

The processor 130 may estimate the second relative position of the external electronic device 200 relative to the electronic device 100 by performing a double integral with respect to the relative acceleration of the external electronic device 200 calculated through operation 903, and may estimate the relative position of the external electronic device 200 relative to the electronic device 100 based on the first relative position and the second relative position.

For example, the processor 130 may estimate the relative position, the relative velocity, and the relative acceleration bias of the external electronic device 200 relative to the electronic device 100 by applying, to the EKF, the first relative position of the external electronic device 200 estimated through operation 301 and the estimated second relative position of the external electronic device 200. In addition, the processor 130 may estimate the relative position (or an 'optimized relative position') of the external electronic device 200 relative to the electronic device 100, based on the relative position, the relative velocity, and the relative acceleration bias of the external electronic device 200 estimated through the EKF.

According to another embodiment, the processor 130 may estimate the relative pose (or the 'optimized relative pose') of the external electronic device 200 relative to the electronic device 100 by applying, to the EKF, the relative pose of the external electronic device 200 estimated through operation 302 shown in FIG. 3.

Hereinafter, accuracy of the relative position of the relative position estimated through the electronic device will be described in detail.

Figure 10:
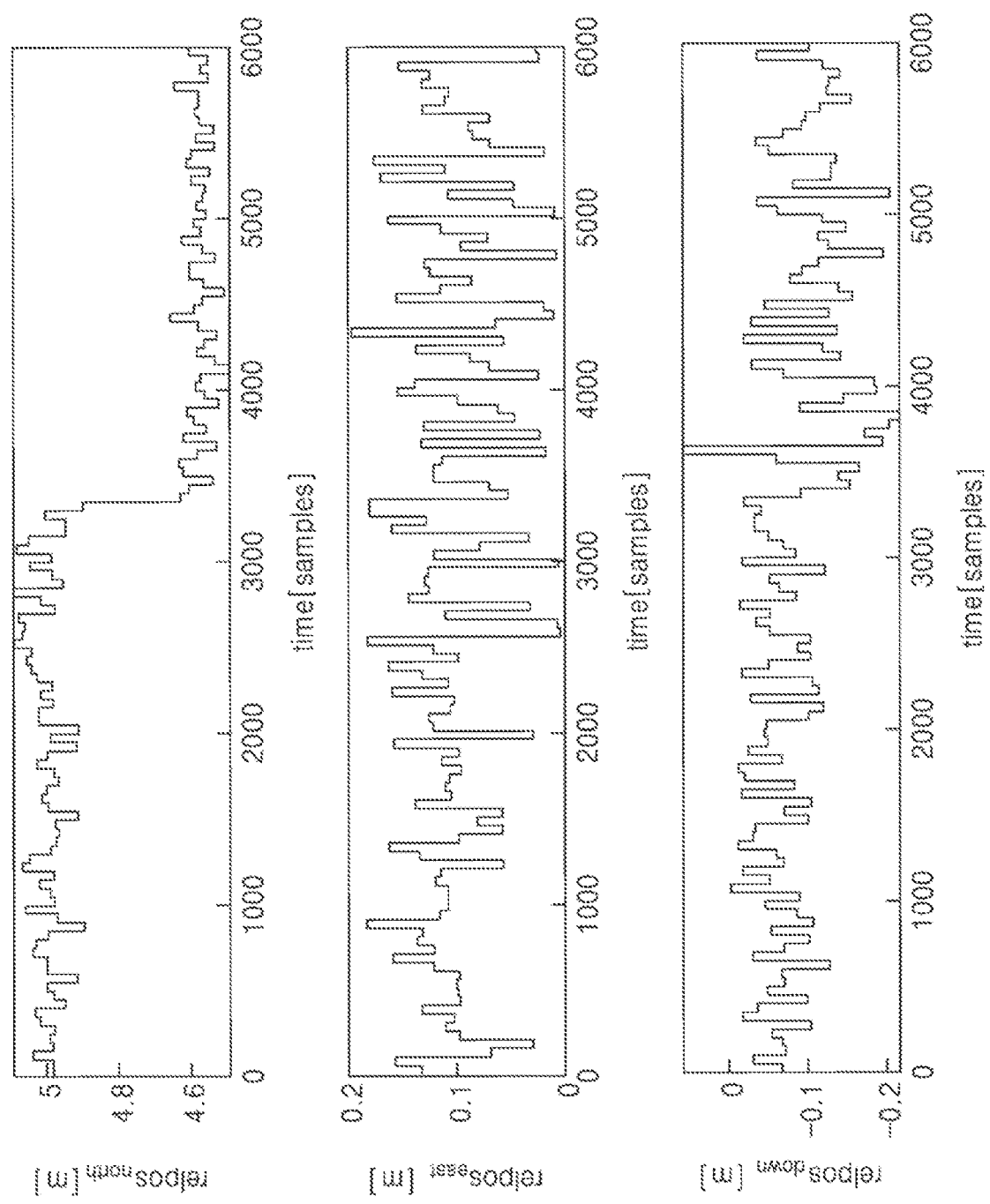
FIG. 10 is a graph illustrating a result of estimating a relative position of an external electronic device based on a time of arrival, according to an embodiment.
Figure 11:
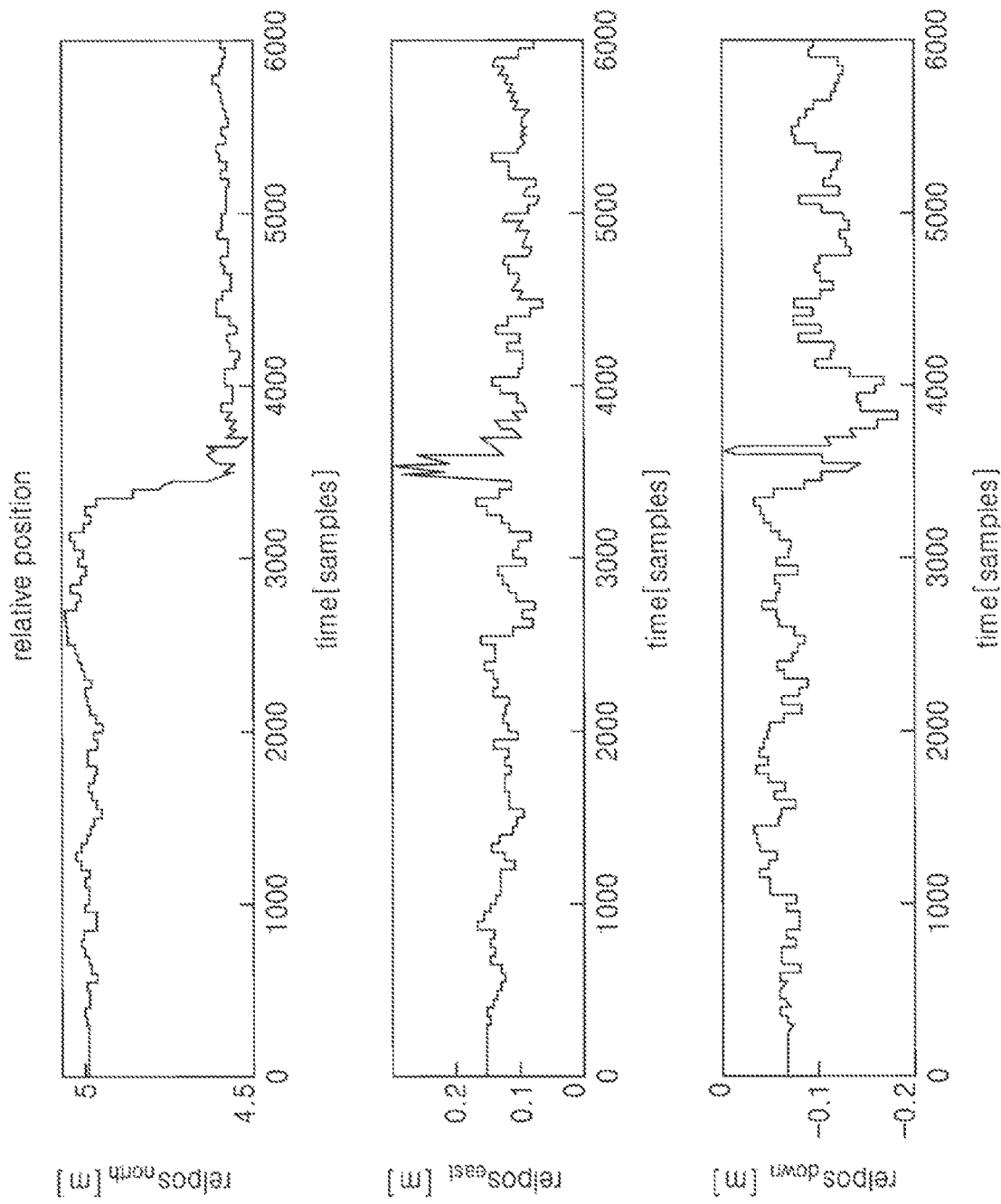
FIG. 11 is a graph illustrating a result of estimating a relative position of an external electronic device through an electronic device, according to an embodiment.

FIG. 10 is a graph illustrating a result of estimating a relative position of an external electronic device based on a TOA, at which a signal transmitted from at least one anchor arrives at the external electronic device, according to an embodiment. FIG. 11 is a graph illustrating a result of estimating a relative position of an external electronic device through an electronic device, according to an embodiment.

FIGS. 10 and 11 indicate a change in the relative position of the external electronic device relative to the electronic device when a range from the electronic device to the external electronic device decreases by 0.5 m with reference to the north direction of the navigation frame in a pause state.

Referring to FIG. 10, noise included in the wireless signal may cause errors to the result of estimating the relative position of the external electronic device when the relative position of the external electronic device relative to the electronic device is estimated based on TOA at which the wireless signal transmitted from at least one anchor (e.g., the at least one anchor 111 shown in FIG. 2) of a first sensor (e.g., the first sensor 110 shown in FIG. 2) arrives at the external electronic device.

In contrast, referring to FIG. 11, the relative position of the external electronic device estimated through the electronic device (e.g., the electronic device 100 shown in FIGS. 1 and 2) may be more accurately estimated compared with a result of estimating the relative position of the external electronic device based on TOA of the wireless signal transmitted from the first sensor.

That is, the electronic device 100 according to an embodiment may more accurately estimate the relative position of the external electronic device 200 relative to the electronic device 100 by fusing, through the EKF, the first relative position of the external electronic device 200 estimated through the first sensor 110 and the second relative position of the external electronic device 200 estimated through a second sensor (e.g., the second sensor 120 shown in FIG. 2). As a result, the electronic device 100 may provide more realistic and accurate AR images through the relative position of the external electronic device 200 that has been accurately estimated.

The method of estimating the relative position and the relative pose of the external electronic device 200 may be recorded on a non-transitory computer-readable record medium having recorded thereon at least one program including instructions for executing the method. A computer-readable recording medium includes a magnetic media such as hard disk, floppy disk, and a magnetic tape; an optical media such as CD-ROM, DVD, a magneto-optical media such as a floptical disk; and a hardware device specifically configured to store and execute program instructions, for example, ROM, RAM, and flash memory. Program instructions include high-level language codes that may be executed by a computer using an interpreter or the like, as well as machine language codes generated by a compiler.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An electronic device comprising:
 a first sensor comprising: at least one anchor configured to transmit a signal having a preset frequency, and a tag;
 a second sensor comprising an inertial sensor configured to measure an acceleration of the electronic device and an angular velocity of the electronic device, and a geo-magnetic sensor configured to measure a magnetic field around the electronic device;
 a memory storing at least one instruction; and
 a processor operatively connected to the first sensor and the second sensor,
 wherein the processor is configured to execute the at least one instruction to:
  estimate a first relative position of the external electronic device relative to the electronic device, based on a time of arrival at which a signal transmitted from the at least one anchor arrives at the external electronic device,
  estimate a first relative pose of the external electronic device relative to the electronic device, based on a value measured by the inertial sensor and a value measured by the geo-magnetic sensor,
  convert an acceleration of the electronic device in a sensor frame, measured by the inertial sensor, into an acceleration of the electronic device in a navigation frame, based on the estimated first relative pose of the external electronic device relative to the electronic device,
  calculate a relative acceleration of the external electronic device relative to the electronic device, based on the converted acceleration of the electronic device in the navigation frame, and
  estimate a relative position and a relative pose of the external electronic device relative to the electronic device by applying the calculated relative acceleration and the estimated first relative position of the external electronic device to an Extended Kalman Filter.

2. The electronic device of claim 1, wherein the first sensor comprises:
 a first anchor disposed parallel to the tag;
 a second anchor spaced apart from the first anchor and arranged parallel to the tag;
 a third anchor disposed perpendicular to the tag; and
 a fourth anchor spaced apart from the third anchor and disposed perpendicular to the tag.

3. The electronic device of claim 2, wherein the first anchor, the second anchor, the third anchor, and the fourth anchor are arranged radially with reference to the tag, and wherein the tag is disposed at a central position between of the first anchor and the second anchor, and between the middle of the third anchor and the fourth anchor.

4. The electronic device of claim 2, wherein the processor is further configured to execute the at least one instruction to:

measure a range between the first anchor, the second anchor, the third anchor, the fourth anchor and a tag of the external electronic device, based on a time of arrival at which signals transmitted from the first anchor, the second anchor, the third anchor, and the fourth anchor arrive at the tag of the external electronic device, calculate, through a moving average filter, a moving average of the measured range between the first anchor, the second anchor, the third anchor, the fourth anchor and the tag of the external electronic device, after excluding a maximum value and a minimum value of the measured range between the first anchor, the second anchor, the third anchor, the fourth anchor and the tag of the external electronic device, and calculate the relative position of the external electronic device relative to the electronic device, based on the calculated moving average.

5. The electronic device of claim 4, wherein the processor is further configured to execute the at least one instruction to:

estimate the first relative position by applying, to the Extended Kalman Filter, the estimated relative position of the external electronic device relative to the electronic device.

6. The electronic device of claim 1, wherein the processor is further configured to execute the at least one instruction to:

estimate a pose and a gyro bias of the electronic device by applying, to a Kalman Filter, the value measured by the inertial sensor and the value measured by the geo-magnetic sensor.

7. The electronic device of claim 1, wherein the processor is further configured to execute the at least one instruction to:

calculate the relative acceleration of the external electronic device relative to the electronic device, based on a difference between the acceleration of the electronic device in the navigation frame and an acceleration of the external electronic device in the navigation frame obtained from the external electronic device.

8. The electronic device of claim 1, wherein the processor is further configured to execute the at least one instruction to:

estimate a second relative position of the external electronic device relative to the electronic device, based on the calculated relative acceleration of the external electronic device relative to the electronic device.

9. The electronic device of claim 8, wherein the processor is further configured to execute the at least one instruction to:

estimate the second relative position by performing a double integral with respect to the relative acceleration of the external electronic device relative to the electronic device.

10. The electronic device of claim 8, wherein the processor is further configured to execute the at least one instruction to:

fuse the first relative position and the second relative position through the Extended Kalman Filter.

11. The electronic device of claim 10, wherein the processor is further configured to execute the at least one instruction to:

apply the first relative position and the second relative position to the Extended Kalman Filter in which a relative position error, a relative velocity error, and a relative acceleration bias error of the external electronic device relative to the electronic device are set as state parameters.

12. The electronic device of claim 11, wherein the processor is further configured to execute the at least one instruction to:

estimate the relative position of the external electronic device relative to the electronic device based on the relative position, the relative velocity, and the relative acceleration bias of the external electronic device relative to the electronic device estimated through the Extended Kalman Filter.

13. A method of estimating a relative position and a relative pose of an external electronic device relative to an electronic device, the method comprising:

estimating a first relative position of the external electronic device relative to the electronic device, based on a time of arrival at which a signal transmitted from at least one anchor of the electronic device arrives at the external electronic device;

estimating a first relative pose of the external electronic device relative to the electronic device, based on a value measured by an inertial sensor of the external device and a value measured by a geo-magnetic sensor of the external device;

converting an acceleration of the electronic device in a sensor frame, measured by the inertial sensor, into an acceleration of the electronic device in a navigation frame, based on the estimated first relative pose of the external electronic device relative to the electronic device;

calculating a relative acceleration of the external electronic device relative to the electronic device, based on the converted acceleration of the electronic device in the navigation frame; and estimating a relative position and a relative pose of the external electronic device relative to the electronic device by applying the calculated relative acceleration and the estimated first relative position of the external electronic device to an Extended Kalman Filter.

14. The method of claim 13, wherein the estimating of the first relative position comprises:

measuring a range between a first anchor, a second anchor, a third anchor, a fourth anchor and a tag of the external electronic device based on a time of arrival at which the signals transmitted from the first anchor, the second anchor, the third anchor, and the fourth anchor arrive at a tag of the external electronic device;

calculating, through a moving average filter, a moving average of the measured range between the first anchor, the second anchor, the third anchor, the fourth anchor and the tag of the external electronic device, after excluding a maximum value and a minimum value of the measured range between the first anchor, the second anchor, the third anchor, the fourth anchor and the tag of the external electronic device;

calculating the relative position of the external electronic device relative to the electronic device based on the calculated moving average; and estimating the first relative position by applying the calculated relative position of the external electronic device relative to the electronic device to the Extended Kalman Filter.

15. The method of claim 13, wherein the estimating of the relative pose of the external electronic device relative to the electronic device comprises:

estimating a pose and a gyro bias of the electronic device by applying, to a Kalman Filter, the value measured by the inertial sensor and the value measured by the geo-magnetic sensor.

16. The method of claim 13, wherein the calculating of the relative acceleration of the external electronic device relative to the electronic device comprises:

calculating the relative acceleration of the external electronic device relative to the electronic device, based on a difference between the acceleration of the electronic device in the navigation frame and a relative acceleration of the external electronic device in the navigation frame obtained from the external electronic device.

17. The method of claim 13, further comprising:

estimating a second relative position of the external electronic device relative to the electronic device, based on the calculated relative acceleration of the external electronic device relative to the electronic device.

18. The method of claim 17, wherein the calculating of the second relative position comprises:

estimating the second relative position by performing a double integral with respect to the relative acceleration of the external electronic device relative to the electronic device.

19. The method of claim 17, wherein the estimating of the relative position and the relative pose of the external electronic device relative to the electronic device comprises:

applying the first relative position and the second relative position to the Extended Kalman Filter in which a relative position error, a relative velocity error, and a relative acceleration bias error of the external electronic device relative to the electronic device are set as state parameters.

20. The method of claim 19, wherein the estimating of the relative position and the relative pose of the external electronic device relative to the electronic device further comprises:

estimating the relative position of the external electronic device relative to the electronic device, based on a relative position, a relative velocity, and a relative acceleration bias of the external electronic device relative to the electronic device, which have been estimated through the Extended Kalman Filter.

* * * * *